(12) United States Patent
Ahn et al.

(10) Patent No.: US 11,374,893 B2
(45) Date of Patent: Jun. 28, 2022

(54) METHODS, SERVERS, AND NON-TRANSITORY COMPUTER READABLE RECORD MEDIA FOR CONVERTING IMAGE TO LOCATION DATA

(71) Applicant: LINE Plus Corporation, Seongnam-si (KR)

(72) Inventors: Jong Youn Ahn, Seongnam-si (KR); Donghyun Kim, Seongnam-si (KR); Hey Young Yun, Seongnam-si (KR); Hyukjae Jang, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/420,384

(22) Filed: May 23, 2019

(65) Prior Publication Data
US 2019/0394156 A1 Dec. 26, 2019

(30) Foreign Application Priority Data
Jun. 21, 2018 (KR) ........................ 10-2018-0071451

(51) Int. Cl.
| | | |
|---|---|---|
| *H04L 51/222* | (2022.01) | |
| *G01C 21/36* | (2006.01) | |
| *H04L 51/10* | (2022.01) | |
| *G06T 7/11* | (2017.01) | |
| *G06V 10/44* | (2022.01) | |
| *G06V 30/148* | (2022.01) | |

(52) U.S. Cl.
CPC .......... *H04L 51/20* (2013.01); *G01C 21/3602* (2013.01); *G01C 21/3673* (2013.01); *G06T 7/11* (2017.01); *G06V 10/443* (2022.01); *G06V 30/153* (2022.01); *H04L 51/10* (2013.01)

(58) Field of Classification Search
None
See application file for complete search history.

(56) References Cited

U.S. PATENT DOCUMENTS

| | | | | |
|---|---|---|---|---|
| 8,463,299 | B1 * | 6/2013 | Hladik, Jr. ............ | H04W 4/021 455/457 |
| 2008/0312814 | A1 * | 12/2008 | Broadbent ......... | G01C 21/3611 701/532 |
| 2009/0110302 | A1 * | 4/2009 | Snow .................... | G06T 11/206 382/225 |

(Continued)

FOREIGN PATENT DOCUMENTS

KR 10-2002-0074304 A 9/2002

OTHER PUBLICATIONS

Zhou et al. 'Deep Convolutional Neural Networks for Map-Type Classification', arXiv.org website, May 26, 2018 [retrieved on Mar. 30, 2020]. Retrieved from the Internet: <URL: https://arxiv.org/pdf/1805.10402>. (Year: 2018).*

*Primary Examiner* — Kevin T Bates
*Assistant Examiner* — Dae Kim
(74) *Attorney, Agent, or Firm* — Harness, Dickey & Pierce, P.L.C.

(57) ABSTRACT

A location providing method implemented by a server comprising extracting text from an image received through an application executed on a first client, extracting matched location information corresponding to the image based on the text, and providing the matched location information and the image to one or more clients through the application.

14 Claims, 10 Drawing Sheets

(56) References Cited

U.S. PATENT DOCUMENTS

| | | | | |
|---|---|---|---|---|
| 2011/0231493 | A1* | 9/2011 | Dyor | H04L 67/18 |
| | | | | 709/206 |
| 2011/0282570 | A1* | 11/2011 | Tanioka | G01C 21/3623 |
| | | | | 701/532 |
| 2012/0070090 | A1* | 3/2012 | Chang | G06F 3/005 |
| | | | | 382/218 |
| 2012/0202525 | A1* | 8/2012 | Pettini | H04W 4/21 |
| | | | | 455/456.3 |
| 2016/0155250 | A1* | 6/2016 | Chen | G06T 11/206 |
| | | | | 345/440 |
| 2016/0234652 | A1* | 8/2016 | Chao | H04W 4/025 |
| 2017/0067748 | A1* | 3/2017 | Glover | G01C 21/20 |
| 2018/0181851 | A1* | 6/2018 | Kimura | G06K 19/06 |
| 2018/0202811 | A1* | 7/2018 | Bostick | H04W 4/023 |

* cited by examiner

METHODS, SERVERS, AND NON-TRANSITORY COMPUTER READABLE RECORD MEDIA FOR CONVERTING IMAGE TO LOCATION DATA

CROSS-REFERENCE TO RELATED APPLICATION(S)

This U.S. non-provisional application claims the benefit of priority under 35 U.S.C. § 119 to Korean Patent Application No. 10-2018-0071451 filed on Jun. 21, 2018, in the Korean Intellectual Property Office (KIPO), the entire contents of which are incorporated herein by reference.

BACKGROUND

Field

One or more example embodiments relate to methods, servers and/or computer-readable record media for providing a location matched to an image.

Description of Related Art

An instant messenger that is a typical communication tool refers to software capable of sending and receiving messages or data in real time. A user may register a chat partner, that is, a contact on a messenger and may exchange messages with a counterpart included in a contact list.

This messenger function is popular in a mobile environment of a mobile communication terminal as well as a personal computer (PC).

In general, a messenger supports, for example, a function of sharing a variety of information, such as photos, videos, files, contacts, locations, and schedules among users.

SUMMARY

One or more example embodiments provide a method and system that may find and provide an on-map location matched to a corresponding image with respect to images that are shared through an application.

One or more example embodiments also provide a method and system that may convert, to location data, a captured photo and/or a map image that is transmitted and/or received through an application and may connect the location data to a map.

One or more example embodiments also provide a method and system that may analyze contents of chats that are transmitted and/or received through an application and may provide an on-map location matched thereto.

According to an aspect of at least one example embodiment, there is provided a location providing method implemented by a server comprising at least one processor configured to execute computer-readable instructions included in a memory. The location providing method may include extracting, by the at least one processor, text from an image received through an application executed on a first client, extracting, by the at least one processor, matched location information corresponding to the image based on the text, and providing, by the at least one processor, the matched location information and the image to one or more clients through the application.

The location providing method may further include determining, by the at least one processor, whether the image is a map image using machine learning based image classification.

The extracting of the text may include extracting the text from the image using an optical character recognition (OCR) technique in response to determining the image is a map image.

The extracting of the text may include detecting a text region in the image using corner detection, and extracting the text by performing OCR on the text region in response to determining the image is a map image.

The method may include selecting a reference location matched to the image based on the matched location information, the extracting the matched location information including extracting location information associated with a matched point of interest (POI) name corresponding to the text by referring to a POI table including a plurality of POIs, each of the plurality of POIs being associated with a POI name and corresponding location information.

The selecting of the reference location may include determining a cluster of location information of two or more POIs among the plurality of POIs, the location information of the two or more POIs indicating that the two or more POIs are within a determined distance of each other, and selecting a center point of the cluster as the reference location.

The method may include acquiring a scale of a map corresponding to the image by comparing one or more reference map images to the image, the one or more reference map images being aligned with the image using the reference location as a center of the image.

The method may include acquiring a scale of a map corresponding to the image by, selecting two locations included in the image based on the reference location, and comparing an actual geographical distance between the two locations and a distance therebetween on the image.

The providing may cause the one or more clients to generate and display a map address corresponding to the matched location information.

The location providing method may further include the providing the matched location information is performed in response to determining the text matches a POI name, the matched location information corresponds to the POI name, and the image is included in a message by the application.

The providing of the matched location information may include providing additional information that includes Internet content associated with the match location information.

According to an aspect of at least one example embodiment, there is provided a non-transitory computer-readable record medium storing instructions that, when executed by at least one processor, cause the at least one processor to perform the location providing method.

According to an aspect of at least one example embodiment, there is provided a server including a memory storing computer-readable instructions; and at least one processor configured to execute the computer-readable instructions to, extract text from an image received through an application executed on a first client, extract matched location information corresponding to the image based on the text, and provide the matched location information and the image to one or more clients through the application.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

Figure 1:
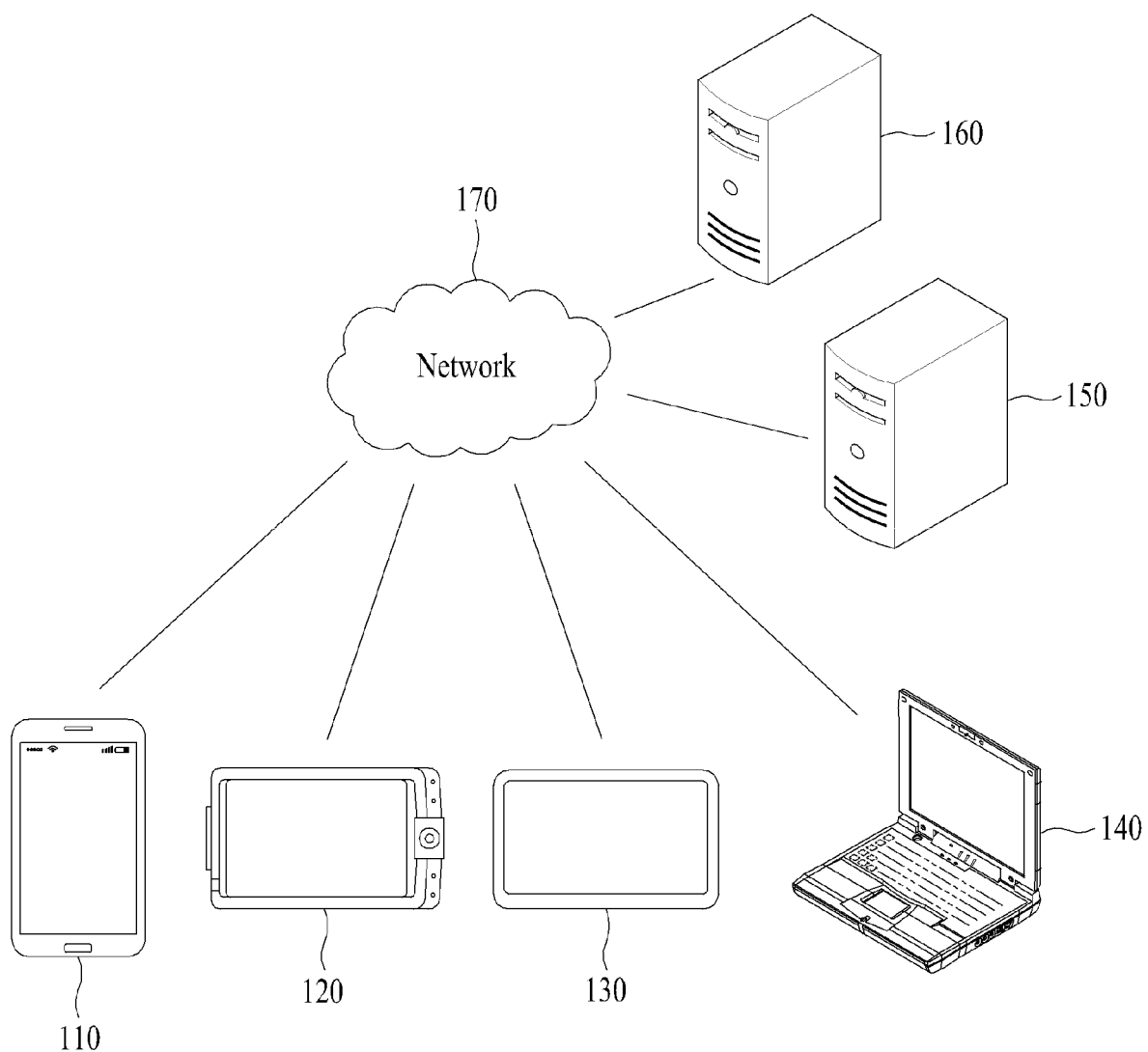
FIG. 1 illustrates an example of a network environment according to at least one example embodiment.

It should be noted that these figures are intended to illustrate the some characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously or contemporaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing example embodiments described herein.

The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

One or more example embodiments relate to methods, servers, and/or computer readable record media for providing a location matched to an image and, more particularly, to methods, servers, and/or computer readable record media for converting an image shared through an application to location data and providing the location data.

Some example embodiments disclosed herein may find and provide an on-map location matched to a corresponding image with respect to images that are shared through an application and may provide improvements in terms of quality of service (QoS), efficiency, and/or cost reduction. For example, a user may provide a simple map capture or rough map image that does not have an address link and the actual address may be found and provided using the image. Thus, another user who has received the image obtains the actual address without executing a separate map search function to search for the location of the place indicated by the image. Accordingly, by providing the location information related to the image by virtue of the image transmission alone, improved quality service may be provided. Additionally, by eliminating or reducing the use of the separate map search function by the other user, resource consumption (e.g., processing, memory, bandwidth and/or energy resources) and/or costs associated therewith may be reduced.

FIG. 1 is a diagram illustrating an example of a network environment according to at least one example embodiment. Referring to FIG. 1, the network environment includes a plurality of electronic devices 110, 120, 130, and/or 140; a plurality of servers 150 and/or 160; and a network 170. FIG. 1 is provided as an example only and thus, the number of electronic devices, the number of servers, and/or the number of networks are not limited thereto.

Each of the plurality of electronic devices 110, 120, 130, and 140 may be a fixed terminal or a mobile terminal configured as a computer system. For example, the plurality of electronic devices 110, 120, 130, and 140 may be a smartphone, a mobile phone, a navigation device, a workstation computer, a laptop computer, a digital broadcasting terminal, a personal digital assistant (PDA), a portable multimedia player (PMP), a tablet personal computer, a personal computer (PC), a game console, a wearable device, an Internet of things (IoT) device, a virtual reality (VR) device, and/or an augmented reality (AR) device. For example, although FIG. 1 illustrates a shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner and/or in a wireless communication manner.

The communication scheme is not particularly limited and may include a communication method using a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and/or 140 over the network 170. The server 160 may be a system that provides a second service to the plurality of electronic devices 110, 120, 130, and/or 140 over the network 170. In detail, the server 150 may provide, as the first service, a service, for example, a messenger service, desired by a corresponding application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
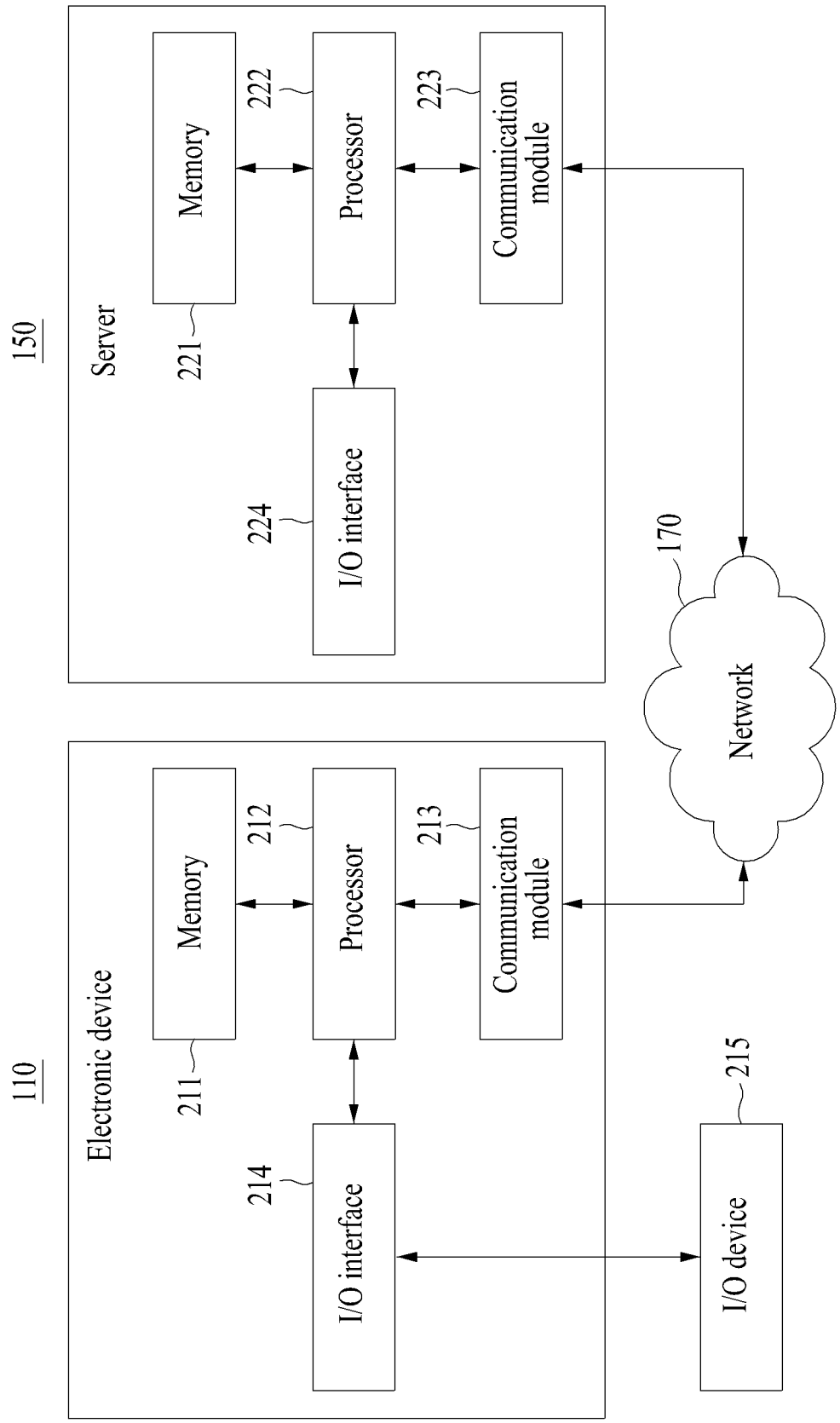
FIG. 2 illustrates an example of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The other electronic devices 120, 130, and/or 140, or the server 160 may have the same or similar components to those of the electronic device 110 or the server 150.

Referring to FIG. 2, the electronic device 110 may include a memory 211, at least one processor 212 (also referred to as "the processor 212"), a communication module 213, and/or an input/output (I/O) interface 214, and the server 150 may include a memory 221, at least one processor 222 (also referred to as "the processor 222"), a communication module 223, and/or an I/O interface 224. However, some example embodiments are not limited thereto, and there may be a greater or lesser number of components included in the electronic device 110 and/or the server 150. The memory 211, 221 may include a permanent mass storage device, such as random access memory (RAM), a read only memory (ROM), a disk drive, a solid state drive (SSD), and a flash memory, as a non-transitory computer-readable storage medium. The permanent mass storage device, such as ROM, SSD, flash memory, and disk drive, may be included in the electronic device 110 or the server 150 as a permanent storage device separate from the memory 211, 221. Also, an operating system (OS) or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable storage medium separate from the memory 211, 221. The other non-transitory computer-readable storage medium may include a non-transitory computer-readable storage medium, for example, a floppy drive, a disk, a tape, a Blu-ray/DVD/CD-ROM drive, a memory card, etc. According to some example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request created based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium further includable in the electronic device 110.

The I/O interface 214 may be a device used for interface with an I/O device 215. For example, an input device may include a device, such as a keyboard, a mouse, a microphone, a camera, a biometric reader, etc., and an output device may include a display device, such as a display, a speaker, a haptic feedback device, etc. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device for interface with an apparatus (not shown) for input or output that may be connected to the server 150 or included in the server 150. In detail, when processing computer-readable instructions of the computer program loaded to the memory 211, the processor 212 of the electronic device 110 may display a service screen configured using data provided from the server 150 or the electronic device 120, or may display content on a display through the I/O interface 214.

According to some example embodiments, the electronic device 110 and the server 150 may include a number of components greater or less than a number of components shown in FIG. 2. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a haptic feedback motor for vibration, etc., which are generally included in the smartphone.

Hereinafter, methods, servers, and/or computer-readable record media for converting an image to location data and providing the location data according to example embodiments is described.

An application (e.g., a chat messaging application) disclosed herein includes a function of providing an on-map location matched to a corresponding image with respect to images shared among clients through the application. Also, the application includes a function of providing an on-map location matched to a corresponding message with respect to messages transmitted and/or received among clients through the application.

The application may include, for example, a social media application of providing a social networking service, such as a messenger and/or a timeline.

Although some example embodiments are described using the messenger as an example in the following, it is provided as an example only. Features related to the present disclosure may apply to various types of social media applications in addition to the messenger.

Figure 3:
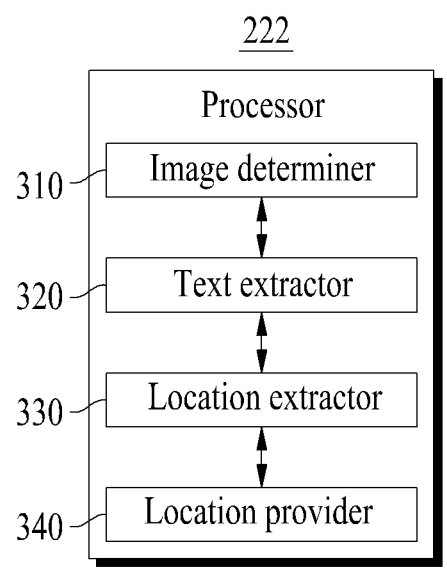
FIG. 3 illustrates an example of components includable in a processor of a server according to at least one example embodiment.
Figure 4:
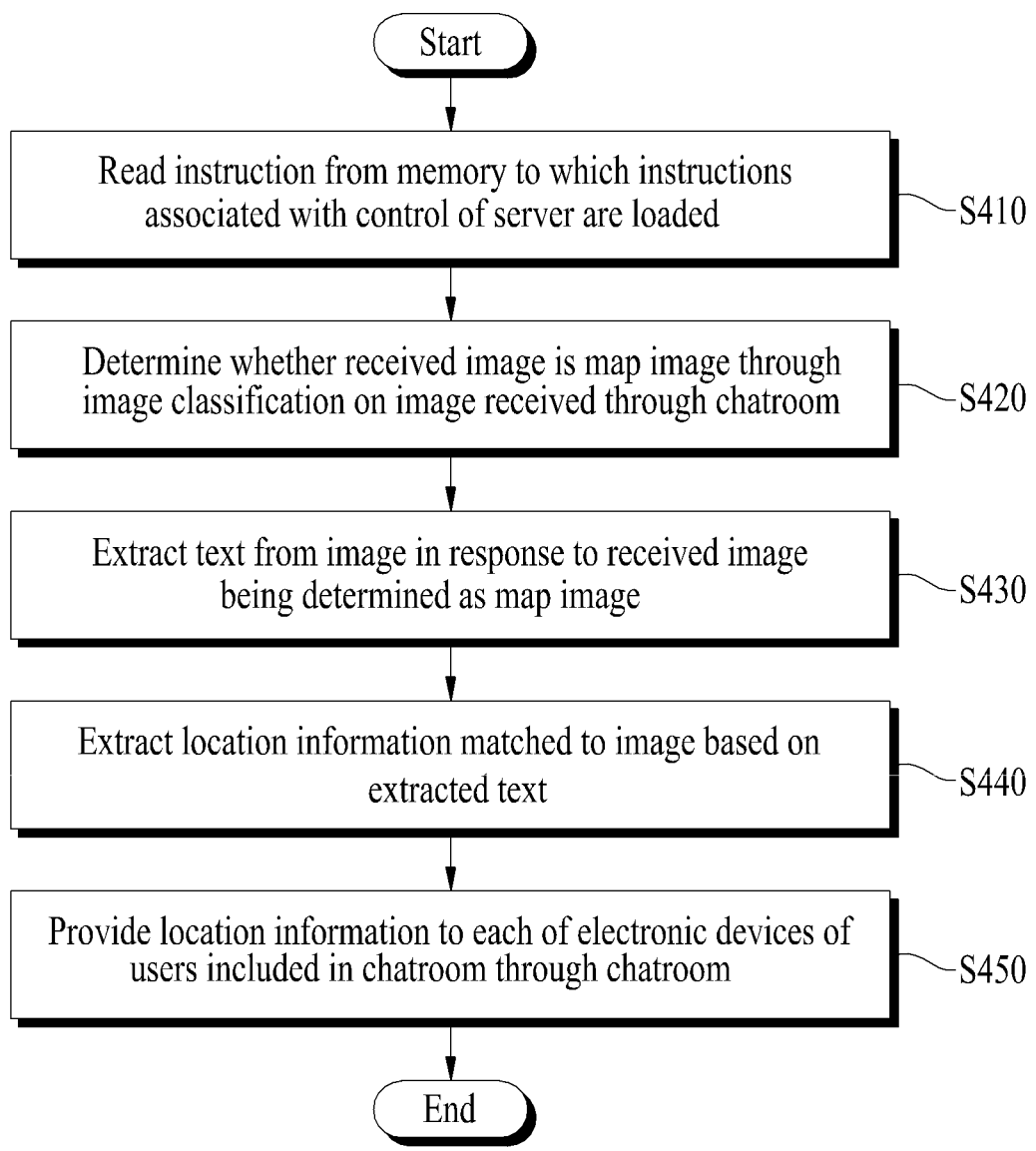
FIG. 4 is a flowchart illustrating an example of a method performed by a server according to at least one example embodiment.

FIG. 3 illustrates an example of components includable in a processor of a server according to at least one example embodiment, and FIG. 4 is a flowchart illustrating an example of a method performed by a server according to at least one example embodiment.

The server 150 according to some example embodiments serves as a platform that provides a messenger service to the plurality of electronic devices 110, 120, 130, and/or 140 that are clients. The server 150 may provide a messenger service in conjunction with an application installed on each of the electronic devices 110, 120, 130, and/or 140. In particular, with respect to an image transmitted and/or received through a chatroom of the messenger, the server 150 may find a location matched to the image and may provide the location.

The server 150 may perform the location providing method of FIG. 4 as a messenger server. For this, referring to FIG. 3, the processor 222 of the server 150 may include an image determiner 310, a text extractor 320, a location extractor 330, and/or a location provider 340 as components. Depending on example embodiments, the components of the processor 222 may be selectively included in or excluded from the processor 222. Also, depending on example embodiments, the components of the processor 222 may be separated or merged for functional representation of the processor 222.

The processor 222 and the components of the processor 222 may control the server 150 to perform operations S410 to S450 included in the location providing method of FIG. 4. For example, the processor 222 and the components of the processor 222 may be configured to execute an instruction according to a code of at least one program and a code of an operating system (OS) included in the memory 221. According to some example embodiments, operations described herein as being performed by any or all of the server 150, the clients (e.g., the electronic devices 110, 120, 130, and/or 140), the image determiner 310, the text extractor 320, the location extractor 330, and/or the location provider 340 may be performed by at least one processor (e.g., the processor 222) executing program code that includes instructions corresponding to the operations. The instructions may be stored in a memory (e.g., the memory 221 of the server 150).

Here, the components of the processor 222 may be representations of different functions of the processor 222 performed by the processor 222 in response to an instruction provided from a program code stored on the server 150. For example, the image determiner 310 may be used as a functional representation of the processor 222 that controls the server 150 in response to the instruction, such that the server 150 may determine whether an image transmitted and/or received through the chatroom is a map image.

Referring to FIG. 4, in operation S410, the processor 222 may read an instruction from the memory 221 to which instructions associated with control of the server 150 are loaded. In this case, the read instruction may include an instruction for controlling the processor 222 to perform operations S420 to S450.

In operation S420, in response to receiving an image to be shared among users through a chatroom of a messenger, the image determiner 310 may determine whether the received image is a map image through an image classification on the received image. When a user of the electronic device 110 desires to share a specific location with another user through a chatroom of the messenger, the user may send an image such as a map and/or a captured screen of the map rather than share an actual map address, for example, a uniform resource locator (URL) in many cases. The image determiner 310 may perform an image classification operation through machine learning, may configure various types of map images as a learning image set, and may determine whether an image received through the chatroom is a map through a learning model that learns the learning image set. For example, the image determiner 310 may classify a map image through a method of extracting a feature included in an image using at least one of a plurality of image recognition algorithms, for example, scale invariant feature transform (SIFT), speeded up robust features (SURF), histogram of oriented gradient (HOG), and/or modified census transform (MCT) algorithm(s), and then calculating a similarity between the extracted feature and a feature determined by an image learning model.

In operation S430, in response to the image received through the chatroom being determined to be a map image, the text extractor 320 may extract a text from the corresponding image. For example, the text extractor 320 may extract the text from the map image through an optical character recognition (OCR) technique. In response to the image received through the chatroom being determined as the map image, the text extractor 320 may detect a text region from the image using a corner detector and may extract a text included in the text region by performing OCR on the detected text region.

In operation S440, the location extractor 330 may extract location information matched (e.g., corresponding) to the map image (also referred to herein as "matched location information") based on the extracted text.

To extract the location information, a map database including information used to provide a map service may be used (e.g., referenced and/or accessed). Here, the map database may be configured as an internal database, for example, stored in the memory 221, of the server 150, or may be present as an external database constructed on another system capable of interacting with the server 150. The map database may include a point of interest (POI) table including on-map POI information (e.g., POI name and/or POI location information). Table 1 shows an example of the POI table.

TABLE 1

| POI name | location information | |
|---|---|---|
| | latitude | longitude |
| AAA | ##.###### | ###.###### |
| BBB | ##.###### | ###.###### |
| CCC | ##.###### | ###.###### |
| DDD | ##.###### | ###.###### |
| EEE | ##.###### | ###.###### |
| FFF | ##.###### | ###.###### |
| GGG | ##.###### | ###.###### |
| HHH | ##.###### | ###.###### |
| ... | ... | ... |

POI information refers to information on a major facility (e.g., building, complex, etc.) on a map and, referring to Table 1, the POI table may be configured such that a POI name may be matched to (e.g., associated with) a latitude and/or a longitude corresponding to location information of the POI.

The location extractor 330 may extract location information (latitudinal and/or longitudinal value(s)) of a POI matched to each text (e.g., each character, symbol, word(s), group of word(s)/symbol(s), etc.) by referring to the POI table with respect to each text extracted from the map image and may select a point at which the extracted location information is concentrated as a reference location. For example, the location extractor 330 may extract the location information associated with a POI name corresponding to the text (also referred to herein as a "matched POI name") by referring to the POI table. During a process of finding POI locations based on texts extracted from the map image, POI locations of another region aside from a region (e.g., a map and/or geographical region) represented by the map image may be included due to the same name or similar names. Accordingly, a center point at which a largest number of POI locations are present (e.g., within a desired/determined/set distance of one another, also referred to as clustering) based on the texts extracted from the map image may be selected as a location that is matched the map image (e.g., the reference location). According to some example embodiments, a cluster of location information of two or more POIs is determined based on the respective location information of the two or more POIs being within a determined, set and/or desired distance of one another. A center point of the cluster may be selected as the reference location.

In addition, the location extractor 330 may acquire a scale value (also referred to herein as a "scale") of a corresponding map (e.g., a corresponding map included in the received image) by reading a map image (e.g., one or more reference map images) corresponding to the reference location from the map database and by matching (e.g., comparing and/or determining similarities and/or difference between) the read map image (e.g., the one or more reference map images) to the map image received through the chatroom (e.g., by mapping corresponding landmarks, such as, roads, POIs, etc.). According to some example embodiments, the one or more reference map images may be aligned with the read map image using the reference location as a center of the received image.

As another example, the location extractor 330 may acquire a scale value by selecting two locations (e.g., POIs) based on the reference location (e.g., by selecting two POIs closest to the reference location), by calculating a distance between the two locations on the received map image, by calculating an actual distance (e.g., a geographical distance) using latitudinal/longitudinal values of the two locations, and by comparing the actual distance and the distance between the two locations on the map image (e.g., the received image). The location extractor 330 may acquire a latitude/longitude of the center point by measuring a distance from a location of a POI matched to one of the texts extracted from the map image to a center point of the corresponding image and by applying the found scale value. According to some example embodiments, the two locations may be selected randomly (e.g., from among locations within a defined radius around the reference location).

Accordingly, the location extractor 330 may extract location information matched to the corresponding image, and the scale value of the map, based on the text extracted from the map image. In some example embodiments, for example, if it is difficult to identify a map through image matching, the location extractor 330 may use location information of a POI matched to a text closest to a center of the map image as the reference location.

In operation S450, the location provider 340 may provide location information matched to the map image to each of electronic devices, for example, the electronic devices 110, 120, 130, and/or 140, of users included in the chatroom through the chatroom (e.g., through the application). In response to an image being uploaded from a sending side client through the chatroom, the server 150 may send an image type message including information on the uploaded image to a receiving side client. The server 150 may extract location information matched to the map image according to the aforementioned logic in response to the uploaded image being identified as the map image and may send the extracted location information to all or some of the clients included in the chatroom. The location information may include location information, for example, latitude and longitude, acquired based on the text extracted from the map image, and may further include a scale value of the map depending on example embodiments. According to some example embodiments, the location information may be separate from the scale value of the map. The location provider 340 may provide one or more of the uploaded image, information on the uploaded image (e.g., Internet content), the location information and/or a scale of the map to one or more of the clients. Each client may generate an actual map address (e.g., street address and/or mailing address) corresponding to the location information based on the latitude, the longitude, and the scale value forwarded from the server 150, and may display the actual map address on the corresponding chatroom. According to some example embodiments, by providing the location information to one or more of the clients, the location provider 340 causes the one or more of the clients to generate and display the actual map address.

Accordingly, in response to the image transmitted and/or received among the users through the chatroom being identified as the map image, such as a map and/or a captured screen of the map, the server 150 may provide location information matched to the image.

As another example, the location provider 340 may search for a recent chat message transmitted and/or received through the chatroom and, in response to a text included in the chat message being matched to a POI name of the POI table of Table 1, may forward location information of a corresponding POI (e.g., the matched POI name) to all or some of the clients included in the chatroom. That is, the location provider 340 may provide location information of a corresponding POI (e.g., latitude and/or longitude) to the chatroom in response to an on-map POI name being included in a chat message. Here, the location provider 340 may provide additional information that includes Internet content, for example, blog and/or a photo, associated with location information of the POI corresponding to the POI name included in the chatroom.

Accordingly, the server 150 may analyze chat content of the chatroom and may provide an on-map location matched to the chat content. Conventional servers enable sharing of images, videos and files, but do not provide the functionality of providing an on-map location matched to an image shared using the conventional servers. This lack of functionality results in unnecessary delay, resource consumption (e.g., processor and/or power resources at the client devices) and/or user inconvenience as users of client devices attempt to identify the on-map location without assistance from the conventional servers. However, some example embodiments provide an improved server (e.g., the server 150) provides the functionality of providing an on-map location matched to an image shared using the improved server. Therefore, the improved server overcomes the deficiencies of the conventional servers discussed above to reduce delay, resource consumption (e.g., processor and/or processor resources at the client devices) and/or user inconvenience.

Hereinafter, a process of converting an image shared through the chatroom to location data and connecting to a map is further described. Here, it is assumed that a user A of the electronic device 110 sends an image to a user B of the electronic device 120.

Figure 5:
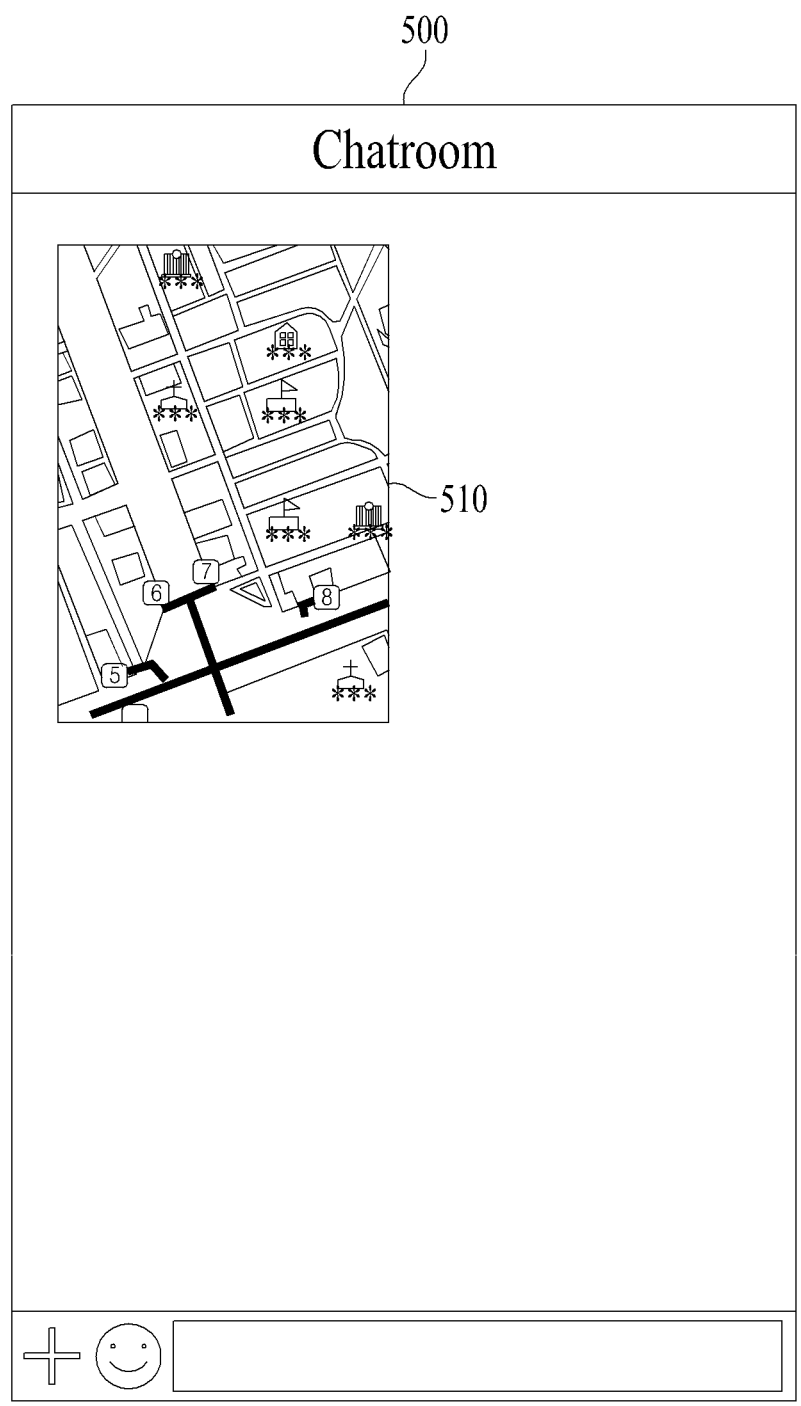
FIG. 5 illustrates an example of a chatroom that enables an image to be shared among users according to at least one example embodiment.

FIG. 5 illustrates an example of a chatroom 500 corresponding to a communication session established between an account of the user A of the electronic device 110 and an account of the user B of the electronic device 120. Referring to FIG. 5, in response to a selection from the user A on an image 510 desired to be shared through the chatroom 500 with the user B, the electronic device 110 may upload the selected image 510 to the chatroom 500 and the server 150 simultaneously or contemporaneously.

Figure 6:
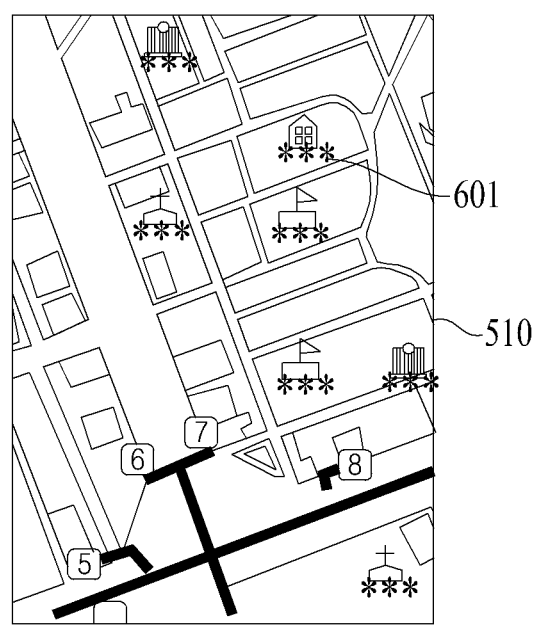
FIG. 6 illustrates an example of a process of extracting a text from an image according to at least one example embodiment.

In response to receiving the image 510 from the electronic device 110 through the communication session established between the account of the user A of the electronic device 110 and the account of the user B of the electronic device 120, the server 150 may determine whether the received image 510 is a map image through image classification. Referring to FIG. 6, in response to the received image 510 being classified as the map image, the server 150 may extract a text 601 from the image 510 through OCR. Since many corners are present in the case of the text 601, an image region is likely to be text (e.g., the text 601) if corners concentrate on a narrow region. With this assumption, the text 601 may be extracted. Initially, the server 150 may extract a text region from the received image 510. For example, the server 150 may detect a corner from the image 510 using a corner detector, such as a Harris corner detector, etc. and may generate a binary corner grid map based on a corner detection result. The server 150 may detect a contour from the binary corner grid map and may extract a text region by binding the detected contour into a desired size of region. The server 150 may perform OCR on the text region extracted from the image 510 and may extract the text 601 included in the text region.

Figure 7:
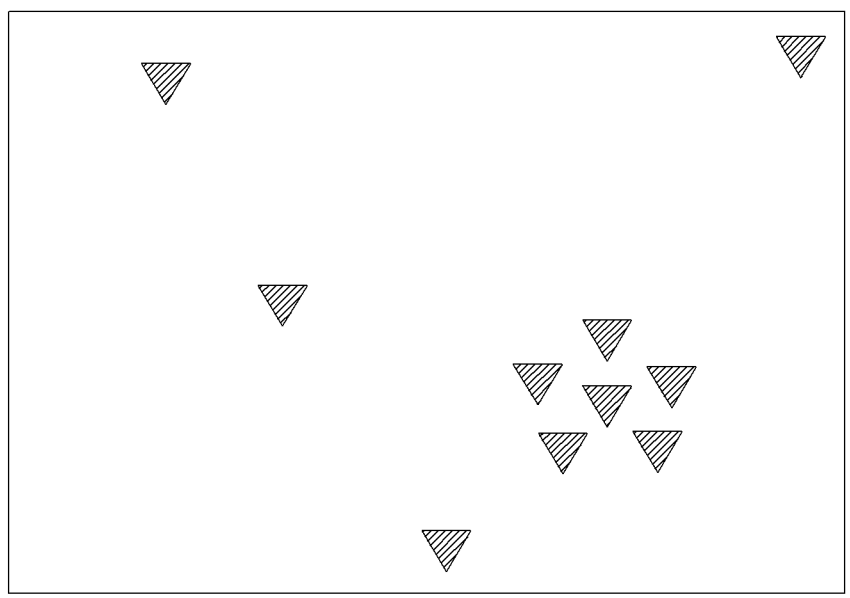
FIGS. 7 to 9 illustrate examples of a process of extracting location information matched to an image according to at least one example embodiment.

The server 150 may extract location information of a POI matched to the text 601 extracted from the image 510 through a POI table including location information for each on-map POI. Referring to FIG. 7, the server 150 may collect location information 701 on a map 700 of a POI matched to the corresponding text 601 with respect to each of the texts 601 extracted from the image 510 and may collect at least one piece of location information 701 for each text 601.

Figure 8:
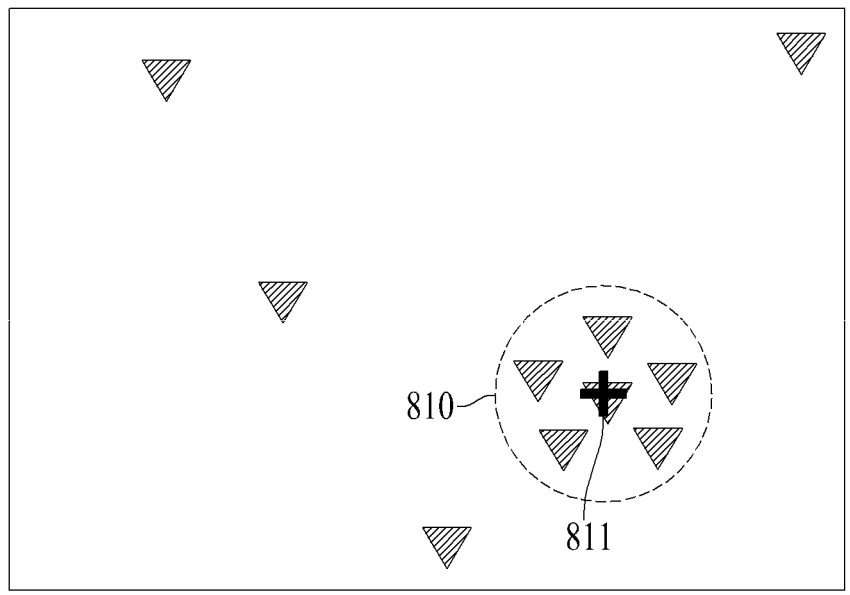

Here, the server 150 may include the location information 701 of, not only a region associated with the image 510, but also a region irrelevant thereto due to the same name or similar names between the text 601 and the POI. Referring to FIG. 8, during a process of collecting the location information 701 based on the text 601 extracted from the image 510, the server 150 may recognize a region 810 in which the location information 701 is most dense as a region (e.g., a cluster) of the image 510 and may select a center point of the region 810 as a reference point 811 (also referred to herein as a reference position and/or a reference location) matched to the image 510. For example, the server 150 may determine the region 810 in which a largest number of pieces of location information 701 are present by clustering the location information 701 within a desired distance.

Figure 9:
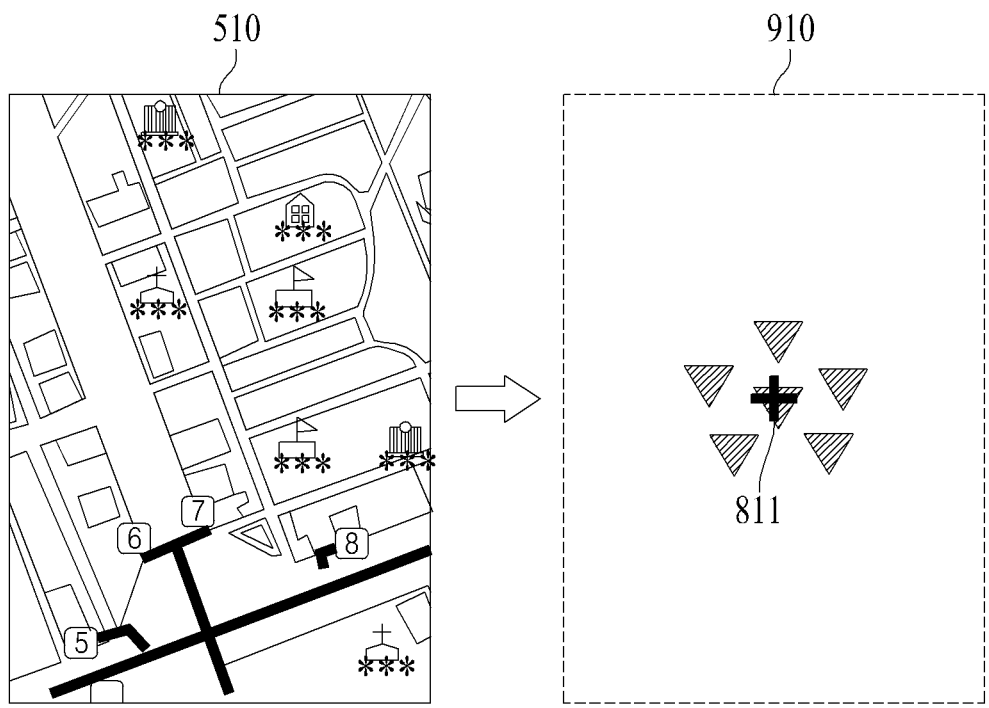

Referring to FIG. 9, the server 150 may find a scale value corresponding to the image 510 by acquiring a map image 910 (e.g., one or more reference map images) based on the reference position 811 and then matching the map image 910 to the image 510 received through the chatroom 500. The server 150 may acquire the scale value of the map by comparing a location of the text 601 in the image 510 and a POI location in the map image 910.

The server 150 may forward, to all of the clients, for example, the user A and the user B, included in the chatroom 500, location information matched to the image 510, that is, latitudinal and longitudinal values of the reference location 811, and the scale value acquired through matching to the image 510, through the chatroom 500. According to some example embodiments, the latitudinal and longitudinal values of the reference location 811 may be provided as location information corresponding to the image 510 when a plurality of POIs are included in the image 510.

Figure 10:
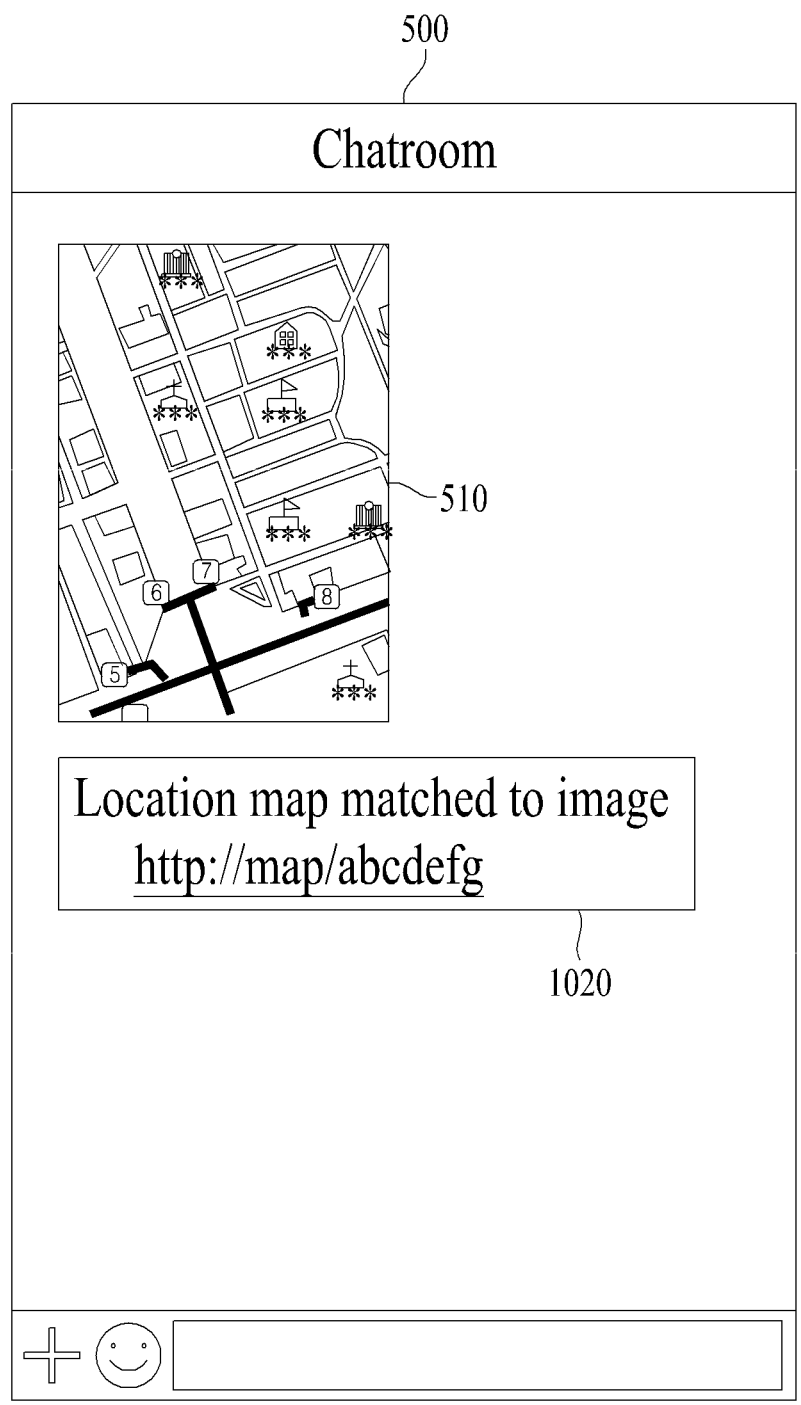
FIG. 10 illustrates an example of a chatroom through which a map address matched to an image is provided according to at least one example embodiment.

Each of the clients that are the user A sending the image 510 and the user B receiving the image 510 may generate location information received from the server 150 as a map address and may display the map address on the chatroom 500. Referring to FIG. 10, each client may generate an actual map address 1020 corresponding to the location information based on the latitude, the longitude, and the scale value forwarded from the server 150 with respect to the image 510 shared through the chatroom 500, and may display the generated map address 1020 on the chatroom 500. According to some example embodiments, the actual map address 1020 may be provided as a URL.

Accordingly, the server 150 may convert the image 510 shared through the chatroom 500 to location data and may connect to a map corresponding to the location data.

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of one or more of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A location providing method implemented by a server comprising at least one processor configured to execute computer-readable instructions included in a memory, the location providing method comprising:

extracting, by the at least one processor, text from an image received through a messaging application executed on a first client;

extracting, by the at least one processor, matched location information corresponding to the image based on the text, the extracting the matched location information including extracting respective matched location information associated with a plurality of points of interest (POIs);

determining a cluster corresponding to the respective matched location information of two or more POIs among the plurality of POIs;

selecting a center point of the cluster as a reference location matched to the image;

generating, by the at least one processor, a message containing the image and the reference location; and providing, by the at least one processor, the message to one or more second clients through a communication session established between the first client and the one or more second clients associated with the messaging application, wherein the selecting includes selecting the center point as the reference location based on the matched location information, the extracting the matched location information includes extracting location information associated with a matched point of interest (POI) name corresponding to the text by referring to a POI table including the plurality of POIs, each of the plurality of POIs being associated with a POI name and corresponding location information, and the location information of the two or more POIs indicates that the two or more POIs are within a determined distance of each other.

2. The location providing method of claim 1, further comprising:
determining, by the at least one processor, whether the image is a map image using machine learning based image classification.

3. The location providing method of claim 2, wherein the extracting the text comprises extracting the text from the image using an optical character recognition (OCR) technique in response to determining the image is a map image.

4. The location providing method of claim 2, wherein the extracting the text comprises:
detecting a text region in the image using corner detection, and
extracting the text by performing OCR on the text region in response to determining the image is a map image.

5. The location providing method of claim 1, further comprising:
acquiring a scale of a map corresponding to the image by comparing one or more reference map images to the image, the one or more reference map images being acquired based on the reference location as a center of the one or more reference map images, and the one or more reference map images being aligned with the image using the reference location.

6. The location providing method of claim 1, further comprising:
acquiring a scale of a map corresponding to the image by, selecting two locations included in the image based on the reference location, and
comparing an actual geographical distance between the two locations and a distance therebetween on the image.

7. The location providing method of claim 1, wherein the providing the message causes the one or more second clients to generate and display a map address corresponding to the matched location information.

8. The location providing method of claim 1, wherein
the providing the message is performed in response to determining the text matches a POI name, and
the matched location information corresponds to the POI name, and
the image is included in another message by the messaging application.

9. The location providing method of claim 8, wherein the providing the message comprises providing additional information that includes Internet content associated with the match location information.

10. The location providing method of claim 1, wherein
the image is received through the communication session established by the messaging application, and
the providing includes providing the message through the communication session to all of the one or more second clients and the first client.

11. A non-transitory computer-readable record medium storing instructions that, when executed by at least one processor, cause the at least one processor to perform the location providing method of claim 1.

12. A location providing method implemented by a server comprising at least one processor configured to execute computer-readable instructions included in a memory, the location providing method comprising:
extracting, by the at least one processor, text from an image received through a messaging application executed on a first client;
extracting, by the at least one processor, matched location information corresponding to the image based on the text, the extracting the matched location information including extracting respective matched location information associated with a plurality of points of interest (POIs);
determining a cluster corresponding to the respective matched location information of two or more POIs among the plurality of POIs;
selecting a center point of the cluster as a reference location matched to the image;
generating, by the at least one processor, a message containing the image and the reference location;
providing, by the at least one processor, the message to one or more second clients through a communication session established between the first client and the one or more second clients associated with the messaging application; and
determining, by the at least one processor, whether the image is a map image using machine learning based image classification,
wherein the extracting the text includes
detecting a text region in the image using corner detection, and
extracting the text by performing OCR on the text region in response to determining the image is a map image.

13. A location providing method implemented by a server comprising at least one processor configured to execute computer-readable instructions included in a memory, the location providing method comprising:
extracting, by the at least one processor, text from an image received through a messaging application executed on a first client;
extracting, by the at least one processor, matched location information corresponding to the image based on the text, the extracting the matched location information including extracting respective matched location information associated with a plurality of points of interest (POIs);
determining a cluster corresponding to the respective matched location information of two or more POIs among the plurality of POIs;
selecting a center point of the cluster as a reference location matched to the image;
generating, by the at least one processor, a message containing the image and the reference location; and
providing, by the at least one processor, the message to one or more second clients through a communication session established between the first client and the one or more second clients associated with the messaging application,
wherein
the selecting includes selecting the center point as the reference location based on the matched location information,
the extracting the matched location information includes extracting location information associated with a matched point of interest (POI) name corresponding to the text by referring to a POI table including the plurality of POIs, each of the plurality of POIs being associated with a POI name and corresponding location information, and the location providing method further comprises acquiring a scale of a map corresponding to the image by comparing one or more reference map images to the image, the one or more reference map images being acquired based on the reference location as a center of the one or more reference map images, and the one or more reference map images being aligned with the image using the reference location.

14. A location providing method implemented by a server comprising at least one processor configured to execute computer-readable instructions included in a memory, the location providing method comprising:

extracting, by the at least one processor, text from an image received through a messaging application executed on a first client;

extracting, by the at least one processor, matched location information corresponding to the image based on the text, the extracting the matched location information including extracting respective matched location information associated with a plurality of points of interest (POIs);

determining a cluster corresponding to the respective matched location information of two or more POIs among the plurality of POIs;

selecting a center point of the cluster as a reference location matched to the image;

generating, by the at least one processor, a message containing the image and the reference location; and providing, by the at least one processor, the message to one or more second clients through a communication session established between the first client and the one or more second clients associated with the messaging application, wherein the selecting includes selecting the center point as the reference location based on the matched location information, the extracting the matched location information includes extracting location information associated with a matched point of interest (POI) name corresponding to the text by referring to a POI table including the plurality of POIs, each of the plurality of POIs being associated with a POI name and corresponding location information, and the location providing method further comprises acquiring a scale of a map corresponding to the image by, selecting two locations included in the image based on the reference location, and comparing an actual geographical distance between the two locations and a distance therebetween on the image.

* * * * *